United States Patent [19]

Takemura

[11] Patent Number: 5,553,036
[45] Date of Patent: Sep. 3, 1996

[54] APPARATUS AND METHOD FOR WRITING AND READING DIGITAL INFORMATION ON A MAGNETIC MEMORY INCLUDING A SUPERCONDUCTING MATERIAL

[75] Inventor: Yasuhiko Takemura, Atsugi, Japan

[73] Assignee: Semiconductor Energy Laboratory Co., Ltd., Kanagawa-ken, Japan

[21] Appl. No.: 673,380

[22] Filed: Mar. 22, 1991

[30] Foreign Application Priority Data

Mar. 27, 1990 [JP] Japan ................... 2-77791

[51] Int. Cl.$^6$ .............................. G11B 11/10
[52] U.S. Cl. ................. 369/13; 369/14; 369/15; 365/160; 505/100
[58] Field of Search ............... 369/13, 14, 15, 369/101; 365/160, 161, 163, 162; 307/277, 306; 360/59; 505/831, 832, 1, 848, 860, 874

[56] References Cited

U.S. PATENT DOCUMENTS

| | | |
|---|---|---|
| 3,413,055 | 11/1968 | Sorbo ........................... 365/161 |
| 3,691,539 | 9/1972 | Erban et al. ................... 365/161 |
| 5,070,070 | 12/1991 | Askew et al. ................... 365/161 |
| 5,270,290 | 12/1993 | Yoshimura et al. ............. 369/101 |
| 5,377,141 | 12/1994 | Takemura ........................ 365/160 |

FOREIGN PATENT DOCUMENTS

| | | | |
|---|---|---|---|
| 194559 | 4/1989 | Japan .......................... 369/13 |
| 1159852 | 6/1989 | Japan .......................... 369/13 |
| 1190499 | 7/1989 | Japan .......................... 369/15 |

Primary Examiner—Georgia Y. Epps
Assistant Examiner—Tanh Dinh
Attorney, Agent, or Firm—Sixbey, Friedman, Leedom & Ferguson, P.C.; Gerald J. Ferguson, Jr.; Eric J. Robinson

[57] ABSTRACT

An apparatus and a method for writing and reading digital information on a magnetic memory are disclosed. In the apparatus, no mechanical contact between the memory and a magnetic detection means is made because the magnetic state of a respective domain is detected by detecting change of the whole magnetic fluxes induced by entire domains formed on the memory. The writing and reading operation are carried out by scanning the domain with beam irradiation in order to destruct superconductivity or ferromagnetic characteristics of the domain resulting in trapping or releasing of magnetic fluxes. The change in magnetic flux is detected by the detection means.

22 Claims, 10 Drawing Sheets

FIG. 8
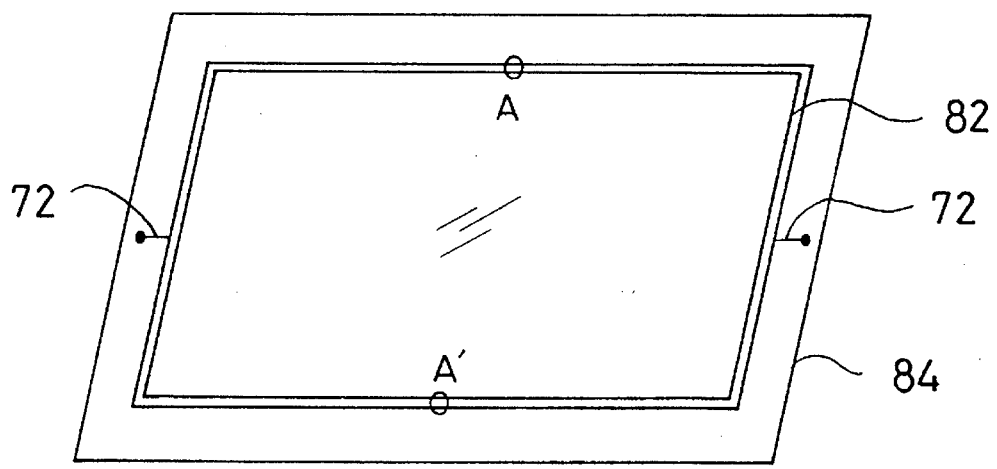
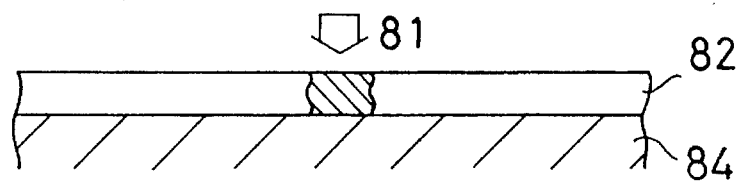
FIG. 9(A)
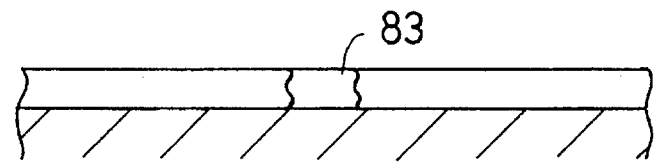
FIG. 9(B)
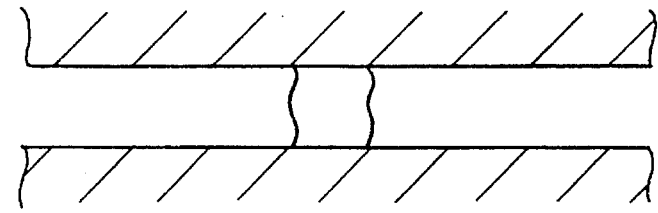
FIG. 9(C)

FIG. 12
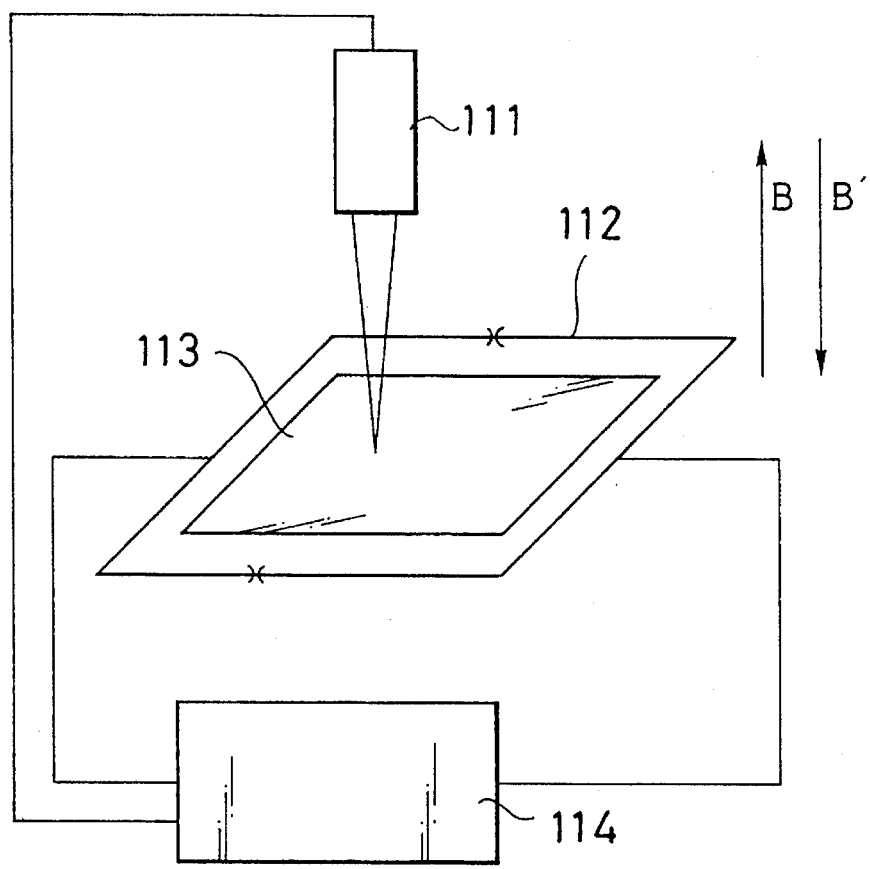
FIG. 13(A)  FIG. 13(B)
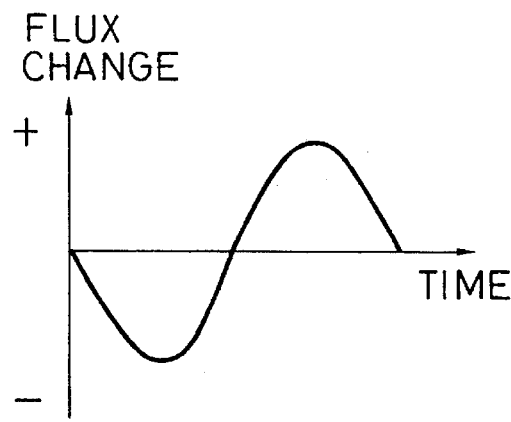
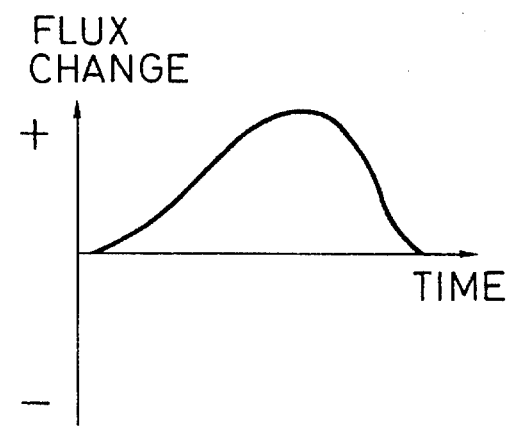

FIG.16(A) 141 → 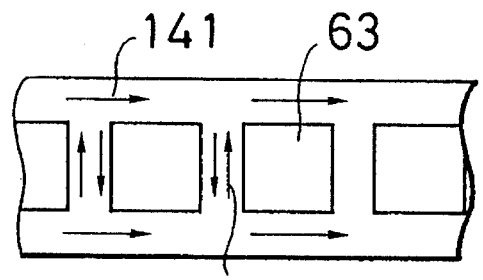
FIG.16(B) 141 → 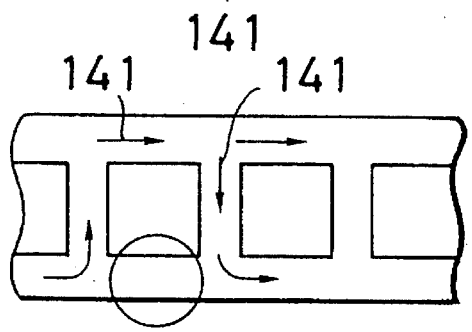
FIG.16(C) 141 → 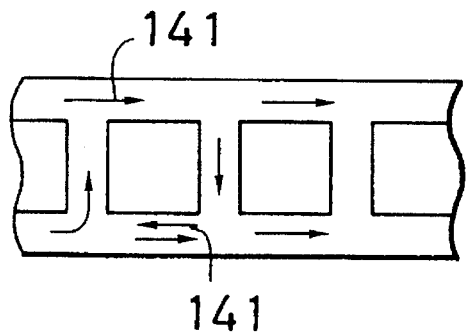
FIG.16(D) 141 → 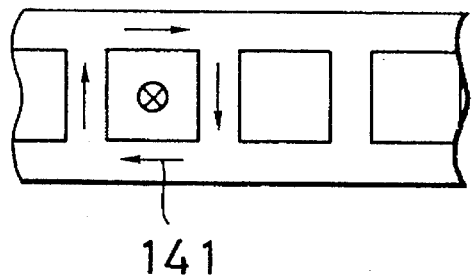

APPARATUS AND METHOD FOR WRITING AND READING DIGITAL INFORMATION ON A MAGNETIC MEMORY INCLUDING A SUPERCONDUCTING MATERIAL

BACKGROUND OF THE INVENTION

1. Field of the Invention

The present invention relates to an apparatus and a method for writing and reading digital information on a magnetic memory.

2. Description of the Prior Art

Magnetic memories using as storage mediums magnetic tapes, magnetic disks and the like have been utilized in external memories for main computers. In such a memory, a magnetic-field detector, called a magnetic head, is provided in proximately contact with the magnetic storage medium in order to detect the magnetic fields induced by respective very small storage domains thereof. The most problematic shortcoming of such a conventional structure is that the head has to make contact with the storage medium so that it is very difficult to improve the reproducing speed and to lengthen the life time of the storage medium. The memory capacities have also been limited due to the area picked up by the head.

Recently, optical disks have been developed in which a laser beam focussed in a very tiny area is directed to depressions formed on the surface of a disk in order to read out information represented by the depressions. The above-mentioned problems have been greatly improved in such optical disks. On the other hand, there has not yet been developed an optical disk which can be repeatedly rewritten. Some researchers have carried out their efforts to utilize opto-magnetic effects such as Faraday effect in order to make rewritable disks. In spite of such efforts, however, there has been not proposed so far practical devices.

The advantage of the use of magnetic phenomena for information storage is the simple process of recording and the stability of stored information for a long time. However, the reproducing of information recorded on an opto-magnetic disk, as described above, is very difficult. On the other hand, the reproducing by means of a head making in contact with the storage medium can be carried out easily whereas there are in this case many shortcomings as described above.

One of solutions of these problems is the use of light rays or electron beams by which read-write operation is carried out. It is, however, impossible to detect a static magnetic field by light rays alone because electromagnetic waves shall not interact with static fields.

In accordance with the mechanism of opto-magnetic storage currently proposed, a magnetic flux is detected in terms of indirect interaction between the flux and photons through a certain mediating substance. The interaction, however, is very weak and therefore leaving various technical problems.

On the other hand, it is possible to detect existence of magnetic fluxes through interaction between a magnetic field and a spin angular momentum. The electric interaction of electrons having ½ spin quantum number, however, is substantially stronger than the magnetic interaction thereof, and therefore it is in practice impossible to magnetically detect by such interaction. Neutrons shall not electrically interact with substances so that it is theoretically possible to read out magnetically recorded information. It is, however, not practical.

BRIEF SUMMARY OF THE INVENTION

It is an object of the present invention to provide a method and an apparatus for writing and reading digital information on a magnetic memory.

It is another object of the present invention to provide a method and an apparatus for writing and reading digital information on a magnetic memory which can be carried out without mechanical contact with a magnetic field detector and the magnetic memory.

It is a further object of the present invention to provide a method and an apparatus for writing and reading digital information on a magnetic memory which can be operated at a high frequency.

Additional objects, advantages and novel features of the present invention will be set forth in the description which follows, and in part will become apparent to those skilled in the art upon examination of the following or may be learned by practice of the present invention. The object and advantages of the invention may be realized and attained by means of the instrumentalities and combinations particularly pointed out in the appended claims.

To achieve the foregoing and other object, and in accordance with the present invention, as embodied and broadly described herein, storage domains formed in a magnetic memory are scanned by irradiation for selectively changing magnetic properties of respective domains. The domains are made from a superconducting or ferromagnetic material in which magnetic fluxes are trapped. When irradiated with a laser beam, an electron beam or any other suitable particle beam, the domain causes phase transition from its superconducting phase to its normal conducting phase or from its ferromagnetic phase to its paramagnetic phase, so that magnetic fluxes can be released from or trapped by the domain. Such irradiation is utilized for writing and reading operation.

In the writing operation, a memory in which all the domains have trapped magnetic fluxes is selectively irradiated in order to release magnetic fluxes from the selected domain. Information is stored thus in terms of existence in the respective domains. The irradiation in this process can be done also in a magnetic field applied in a direction different from the magnetic fluxes. Alternatively, the memory in which all the domains have trapped no magnetic flux is selectively irradiated in a magnetic field in order to trap magnetic fluxes at the selected domains. Information is stored also in terms of existence in the respective domains.

In the reading operation, the memory in which the domains have trapped magnetic fluxes in accordance with information stored is irradiated to release magnetic fluxes from the domain. The release occurs only at the domains trapping fluxes. Information is read thus in terms of decrease in fluxes in the respective domains by this irradiation. Alternatively, the irradiation in this process can be done in a magnetic field applied in the same direction as the magnetic fluxes. In this case, information is read thus in terms of increase in fluxes in the respective domains by this irradiation. Magnetic fluxes are trapped anew only at the domains given no fluxes in advance. In the typical apparatus of the present invention, no mechanical contact between the memory and a magnetic detection means is made because the magnetic state of a respective domain is detected by detecting change of the whole magnetic fluxes induced by entire domains formed on the memory. Accordingly, the speed of writing and reading can be increased because there is no fear of abrasion problem. The packing density of storage domains in the memory is improved. When electron beam is used, the density can be increased to the order of $10^{10}/cm^2$.

BRIEF DESCRIPTION OF THE DRAWINGS

The accompanying drawings, which are incorporated in and form a part of the invention and, together with the description, serve to explain the principles of the invention.

FIG. 8 is a schematic perspective view showing a SQUID for use in an apparatus and a method for writing and reading digital information on a magnetic memory in accordance with the third embodiment of the present invention.

FIGS. 9(A) to 9(C) are schematic cross sectional views for explaining a method for manufacturing the SQUID for use in the third embodiment of the present invention.

FIG. 12 is a schematic diagram showing an apparatus and a method for writing and reading digital information on a magnetic memory in accordance with a fifth embodiment of the present invention.

FIGS. 13(A) and 13(B) are graphical diagrams showing the change in magnetic flux trapped by a domain of the magnetic memory in accordance with the fifth embodiment of the present invention.

FIG. 16(A) to 16(D) are a schematic plan views showing the superconducting pattern formed on a magnetic memory in accordance with an eighth embodiment of the present invention.

DETAILED DESCRIPTION OF THE PREFERRED EMBODIMENTS

Referring now to FIGS. 1(A) and 1(B), FIGS. 2(A) to 2(C), an apparatus and a method for writing and reading digital information on a magnetic memory in accordance with a first embodiment of the present invention will be explained.

The magnetic memory, indicated at 12 in the figures, is prepared in the following steps. A superconducting substrate is provided by depositing a superconducting oxide ceramic film whose composition was expressed by $Bi_2Sr_2CaCu_2O_8$ on the (100) plane of a single crystalline $MgO_2$ plate of 50 mm length, 50 mm width and 2 mm thickness. The deposition is carried out by sputtering to a thickness of 1 μm. The superconducting film can be deposited in the form of a very smooth film in which no grain is applicable. The c-axis of this film was confirmed as being normal to the plane of the substrate by X-ray analysis. The critical temperature of the superconducting film was confirmed to be no higher than 90K by measuring the magnetic susceptibility thereof. The superconducting film is then etched by a known photolithography in order to pattern it in the form of a plurality of 1 μm×1 μm×10 μm rectangular lands arranged in a matrix, each land forming one magnetic domain 14 for storing information of one bit of the memory.

Figure 1A:
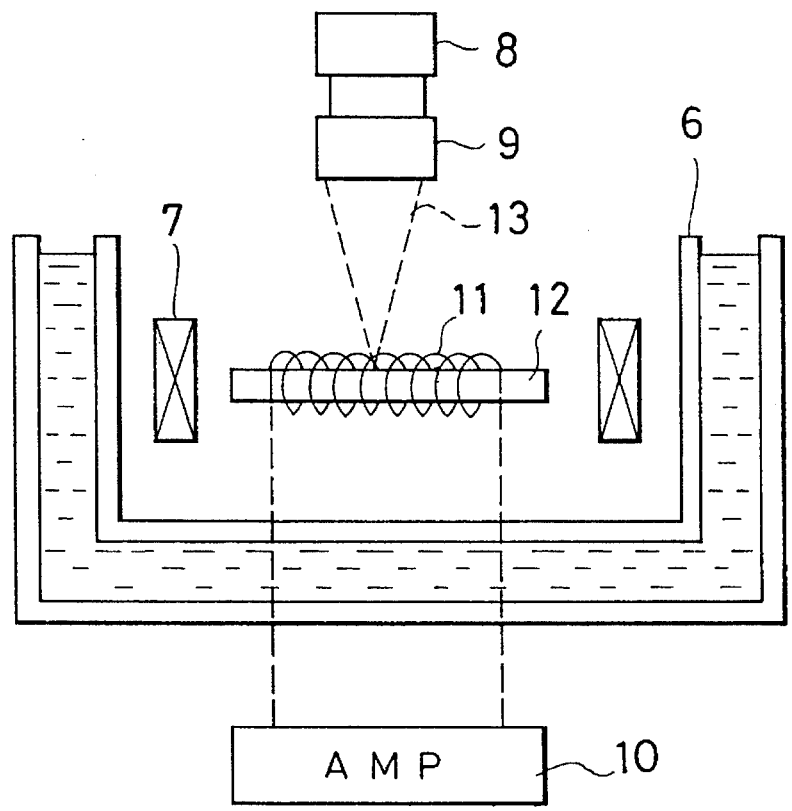
FIGS. 1(A) and 1(B) are schematic diagrams showing an apparatus and a method for writing and reading digital information on a magnetic memory in accordance with a first embodiment of the present invention.
Figure 1B:
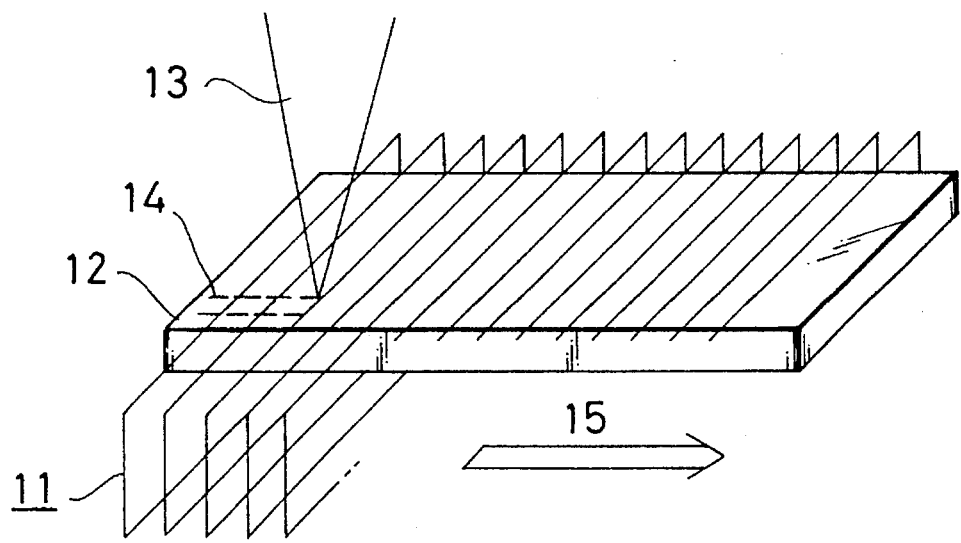
Figure 2A:
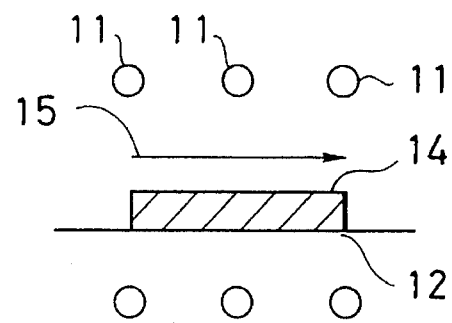
FIGS. 2(A) to 2(C) are explanatory diagrams for explaining the mechanism of magnetic storage in accordance with the first embodiment of the present invention.
Figure 2B:
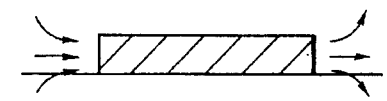

The reading and writing operations on the substrate are carried out as follows. The substrate is first disposed in a coil 11 consisting of a large number of turns provided in a cooling system 6 containing liquid nitrogen (77K) and subjected to a magnetic field in parallel to the substrate 12 as depicted by arrow 15 (FIGS. 1(B) and 2(A)) by means of an electromagnet 7. The direction of the magnetic field is selected to be parallel with the long axis (10 μm) of the domains. The strength of the magnetic field is selected to be stronger than the transition flux density (lower critical field density) of the superconducting material at liquid nitrogen temperature. For example, the strength of the magnetic field is selected to be 0.05 Tesla. The superconducting film on the substrate 12 is then magnetized by the strong magnetic field so that every magnetic domain 14 traps several quantized magnetic fluxes, some of which remain trapped, even after removal of the external magnetic field, in the domain which resumes superconductivity as shown in FIG. 2(B).

Figure 2C:
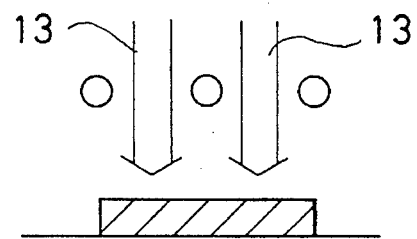

In the writing operation, the superconducting domains 14 formed on the substrate 12 are scanned by a He-Ne laser 8 which can focus a laser beam 13 on one of the domains by means of an optical system 9 without application of any external magnetic field. The energy density of the laser beam is $10^3 W/cm^2$ at the substrate surface. The superconducting domains are not damaged by this energy density. The scanning may be carried out in either direction traversing the short width (1 μm) or the long width (10 μm) of the domain. Of course, the configuration of the coil has to be provided in order not to hinder the irradiation of the substrate 12 with the laser beam. A laser beam is projected to the domain 14 through the turns of the coil 11 as shown in FIG. 2(C). The superconductivity of the domain 14 is decayed when irradiated because the temperature of the domain 14 rises beyond the critical temperature and therefore the trapped fluxes are released from the domain. During scanning, some domains are passed over without irradiation, leaving trapped magnetic fluxes in the domains. In this manner, information can be written in terms of whether or not fluxes are trapped in a domain 14 by selectively irradiating the respective domains with the laser beam.

In the reading operation, the superconducting domains formed on the substrate 12 are scanned by the He-Ne laser 8 in the same manner as in the writing operation without application of the external magnetic field. The laser irradiation, however, is carried out as a probe on all the scanned domains without passover at $10^3 W/cm^2$. When a domain 14 trapping fluxes is irradiated with a laser beam, the superconductivity of the domain 14 is decayed due to elevation of temperature resulting in the decrease of magnetic fluxes passing through the coil 11. The decrease of passing fluxes induces a small voltage (current) in accordance with Faraday's law of induction, i.e. $d\Phi/dt=V$. When a domain 14 trapping no fluxes is irradiated with a laser beam, the superconductivity of the domain is also decayed due to elevation of temperature. The decay does, however, not result in the decrease of magnetic fluxes passing through the coil 11 because there has been trapped no fluxes after and before the decay. The decay thereby induces no current unlike the case of the domain trapping fluxes. Accordingly, it can be detected in terms of existence of the small current whether or not a scanned domain has trapped magnetic fluxes.

Next, the induced voltage which can be used for detection will be theoretically estimated. The base equation is Faraday's law of induction, i.e. $d\Phi/dt=V$. The time period necessary for phase transition is of the order of about $10^{-3}$ second in the case of usual ferromagnetic substances, which time is too long to obtain sufficient induction for detection of change in magnetic fluxes. The time period necessary for phase transition in the case of superconducting substances, however, is of the order of $10^{-9}$ second or shorter. Because of such quick transition, induction of $10^{-6}$ V can be obtained per turn of the coil even if the decrease of magnetic fluxes is of the order of unit of quantized magnetic flux, i.e. of the order of $10^{-15}$ weber. This induction can be detected with the aid of a usual amplifier 10. When an extremely sensitive magnetic-field detector such as a superconducting quantum interference device (SQUID) is available, the detection of induction is possible even if the change in magnetic flux is furthermore weak.

The magnetic fluxes trapped by one domain are as small as $10^{-14}$ weber. The magnetic momentum of one domain (1 $\mu m \times 1$ $\mu m \times 10$ $\mu m$) is $10^{-19}$ weber·m if the fluxes are trapped parallel to the long axis direction of the domain. If a one-turn coil is located around the domain at the nearest distance of 10 $\mu m$ therebetween, the magnetic fluxes passing through the coil is about $2 \times 10^{-15}$ weber. The induced voltage is then calculated to be $10^{-6}$ V on the assumption that the transition of the superconducting domain is completed within $10^{-9}$ second.

As easily understood from the above description, the information recorded on the disk is lost by the reading operation in accordance with this embodiment. Magnetic fluxes released from domains have to be trapped by the domains again in order to restore the recorded condition of the disk. For this purpose, two procedures can be employed. One procedure is to temporarily hold the information in another storage means and write the information on the disk again from the storage means after the read operation. The other procedure is to insert, just after releasing of fluxes from a respective domain, fluxes into that domain as described in FIG. 3. Namely, if change in fluxes number is detected, the currently scanned domain is irradiated with a laser beam in an external magnetic field not more than lower critical field of the superconducting domain. The domain is brought into a normal conductivity state due to elevation of temperature and several fluxes can enter there. The fluxes remain trapped in its superconducting state after the removal of the irradiation and the external magnetic field to restore the bit of information, Thereafter, a subsequent domain is irradiated without the magnetic field in order to detect the magnetic fluxes which may be trapped in the domain. Of course, the irradiation step under the magnetic field is omitted in the sequence when the currently scanned domain has trapped no fluxes.

Figure 4:
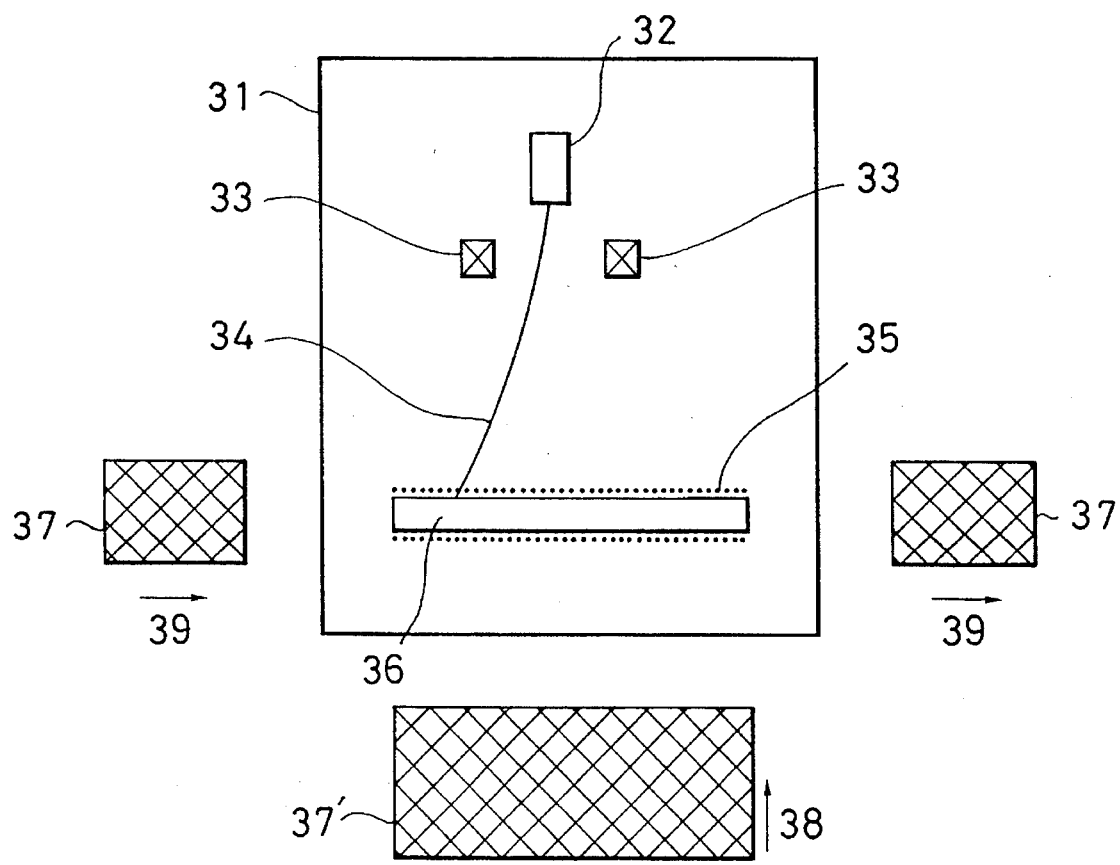
FIG. 4 is a schematic diagram showing an apparatus and a method for writing and reading digital information on a magnetic memory in accordance with a second embodiment of the present invention.

Referring next to FIG. 4, an apparatus and a method for writing and reading digital information on a magnetic memory in accordance with a second embodiment of the present invention will be explained. In this embodiment, the magnetic memory consists of a ferromagnetic substance coated on a substrate.

The magnetic memory, indicated at 36 in the figures, is prepared in the following steps. A Ni thin film is coated on a glass substrate of 50 mm length, 50 mm width and 1 mm thickness. The coating is carried out by vapor evaporation to a thickness of 1 $\mu m$. The Ni film is then etched by means of high energy ultraviolet laser beams in order to pattern it in the form of a plurality of 1 $\mu m \times 1$ $\mu m \times 10$ $\mu m$ rectangular lands arranged in a matrix, each land forming one magnetic domain for storing information of one bit of the memory. The density of the memory capacity of the memory is $10^7$ bits/cm$^2$.

The reading and writing operations on the memory (substrate 36) are carried out as follows. The substrate is first disposed in a coil 35 consisting of a large number of turns provided in a vacuum vessel 31 and subjected to a first magnetic field parallel to the substrate 36 as depicted by arrow 39 by means of electromagnets 37. All of the domains are magnetized by this first magnetic field in parallel to the substrate 36.

In the writing operation, the domains formed on the substrate 36 are scanned by an electron gun 32 which can direct electron beams to one of the domains by means of a deflector 33. During the scanning, the first magnetic field is removed and a second magnetic field is applied to the substrate in the direction, indicated by arrow 38, perpendicular to the substrate by means of an electromagnet 37'. The scanning may be carried out in either direction traversing the short width (1 $\mu m$) or the long width (10 $\mu m$) of the domain. Of course, the configuration of the coil has to be provided in order not to hinder the irradiation of the substrate 36 with the electron beam. The domain comes to exhibit paramagnetism and release magnetic fluxes passing therethrough when irradiated with electron beams because the temperature of the domain rises beyond the Curie point. The domain is then cooled and resumes its ferromagnetic properties, when irradiation is removed, resulting in magnetization perpendicular to the substrate due to the second magnetic field. During scanning, some domains are passed over without irradiation, leaving trapped magnetic fluxes in the domains as being parallel to the substrate. In this manner, information can be written in terms of whether fluxes are trapped by a domain in parallel or perpendicular to the substrate 36 by selectively irradiating the respective domains with the electron beam.

In the reading operation, the ferromagnetic domains formed on the substrate are scanned by the electron beam 32 in the same manner as in the writing operation under the application of the second magnetic field perpendicular to the substrate. The strength of the second magnetic field is $10^{-3}$ Tesla. The irradiation of electron beam, however, is carried out as a probe on all the scanned domains without passover. When a domain trapping fluxes parallel to the substrate is irradiated with an electron beam, the ferromagnetism of the domain is first destroyed due to elevation of temperature resulting in the releasing of magnetic fluxes parallel to the substrate, and secondly appears again as the domain is cooled in order to retain magnetic fluxes perpendicular to the substrate in the second magnetic field. Since the magnetic fluxes perpendicular to the substrate is not counted in the number of fluxes passing through the detection coil 35, a small voltage is induced by the change in direction of fluxes trapped by the domain in accordance with Faraday's law of induction, i.e. $d\Phi/dt=V$. When a domain trapping fluxes perpendicular to the substrate is irradiated with an electron beam, there is no change in magnetic fluxes. The irradiation thereby induces no current unlike the case of the domain trapping fluxes parallel to the substrate. Accordingly, it can be detected in terms of existence of the small voltage whether fluxes are trapped by a domain in parallel or perpendicular to the substrate 36. In accordance with experiments, the reading process of one bit can be carried out within $10^{-7}$ sec or shorter time.

Next, the induced voltage which can be used for detection will be theoretically estimated. The base equation is Faraday's law of induction, i.e. $d\Phi/dt=V$. The time period necessary for disappearance of fluxes parallel to the substrate by heating is of the order of about $10^{-8}$ second. The magnetic momentum of one domain (1 μm×1 μm×10 μm) is $10^{-18}$ weber·m if the fluxes are trapped parallel to the long axis direction of the domain. If a one-turn coil is located around the domain at the nearest distance of 10 μm therebetween, the magnetic fluxes passing through the coil is about $1\times10^{-13}$ weber. The induced voltage is then calculated to be $10^{-5}$ V, which can be easily detected.

Figure 5:
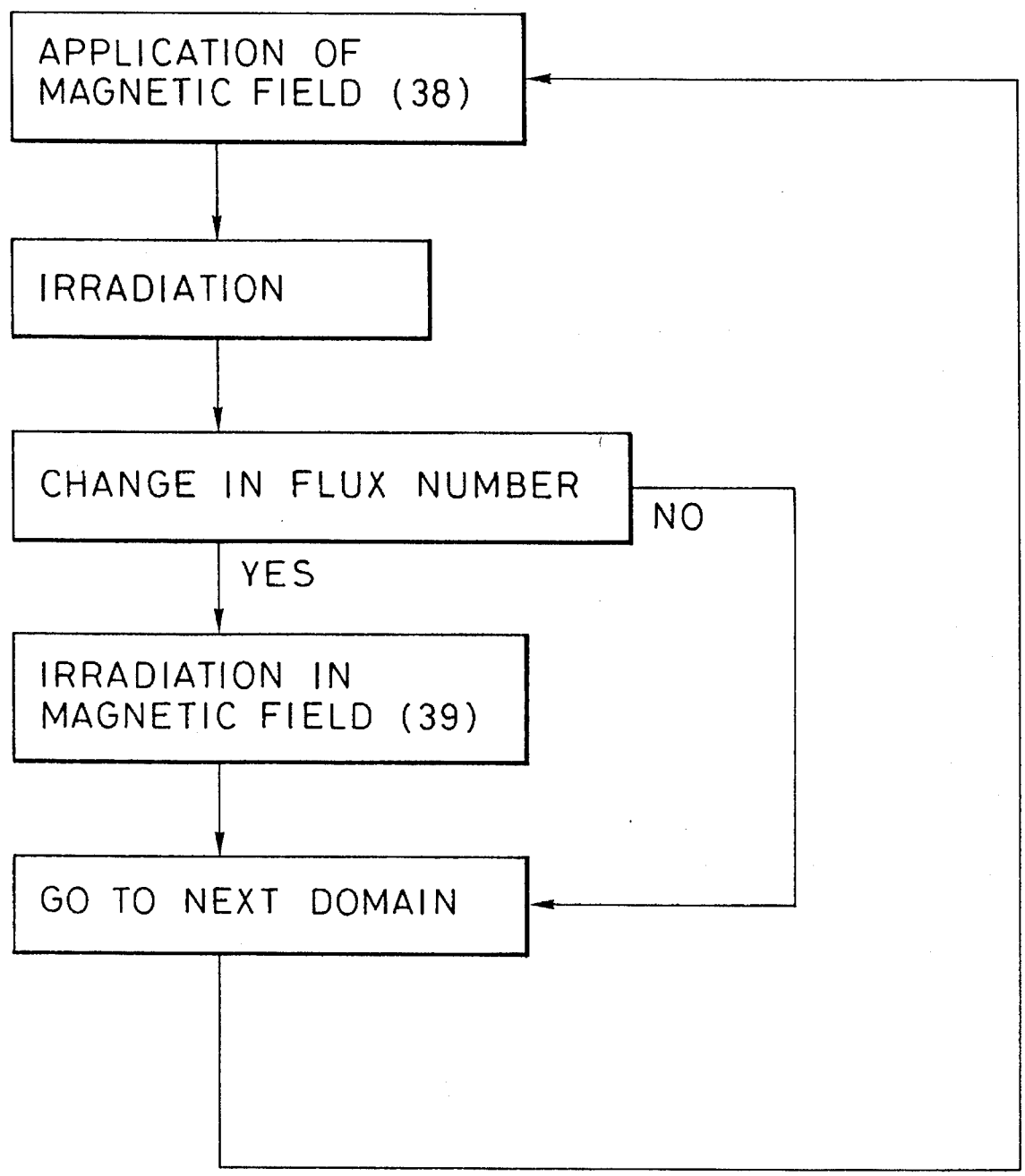
FIG. 5 is a flow chart for explaining the mechanism of restoring information on a magnetic storage domain in accordance with second embodiment of the present invention.

As easily understood from the above description, the information recorded on the disk is deleted by the reading operation in accordance with this embodiment. Magnetic fluxes released from domains have to be trapped in the domains again in order to maintain the recorded condition of the disk. For this purpose, just after change of fluxes in direction in a domain, fluxes parallel to the substrate are restored in that domain as described in FIG. 5. Namely, if change in fluxes is detected, the currently scanned domain is irradiated with an electron beam in the first magnetic field. The strength of the first magnetic field is selected weaker than used for the initial magnetization. The domain is brought into a paramagnetic phase due to elevation of temperature and releases fluxes perpendicular to the substrate. The domain is then cooled and resumes its ferromagnetic properties, when irradiation is removed, resulting in magnetization parallel to the substrate due to the first magnetic field. Thereafter, a subsequent domain is irradiated in the second magnetic field in order to detect the direction of the magnetic fluxes trapped in the domain. Of course, the irradiation step in the first magnetic field is omitted in the sequence when the currently scanned domain has trapped fluxes perpendicular to the substrate.

In this embodiment, a vacuum equipment is required to utilize electron beams so that exchange of recording disks takes a lot of trouble. Several built-in disks may be provided in a vacuum vessel for use in a main frame computer as an auxiliary memory.

Figure 6:
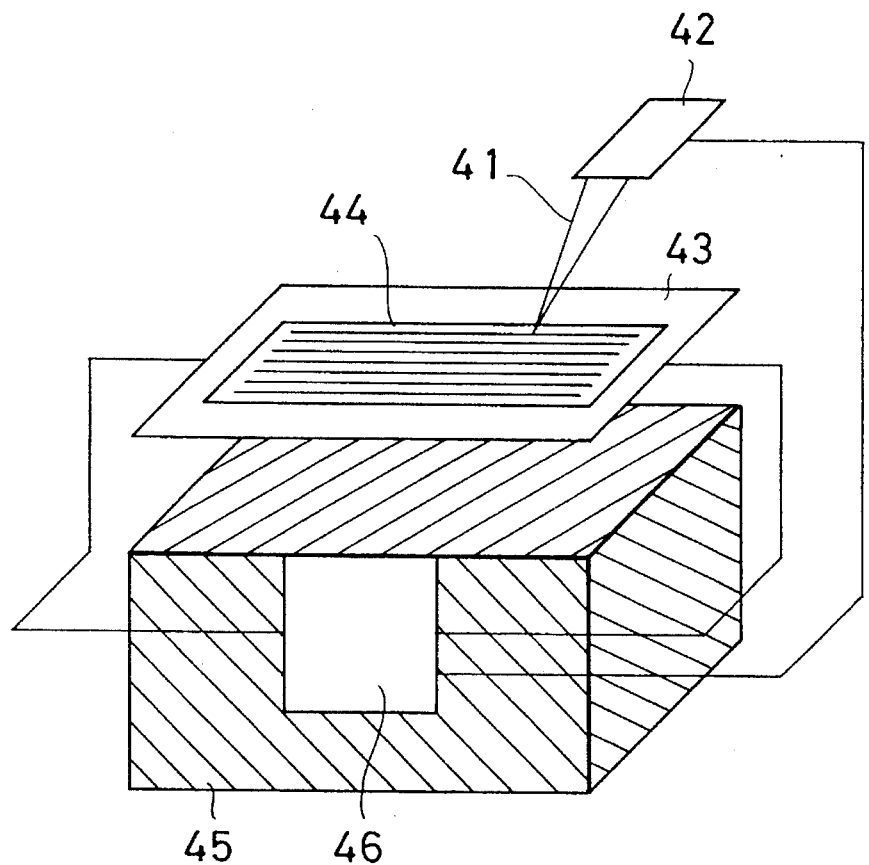
FIG. 6 is a schematic diagram showing an apparatus and a method for writing and reading digital information on a magnetic memory in accordance with a third embodiment of the present invention.
Figure 7:
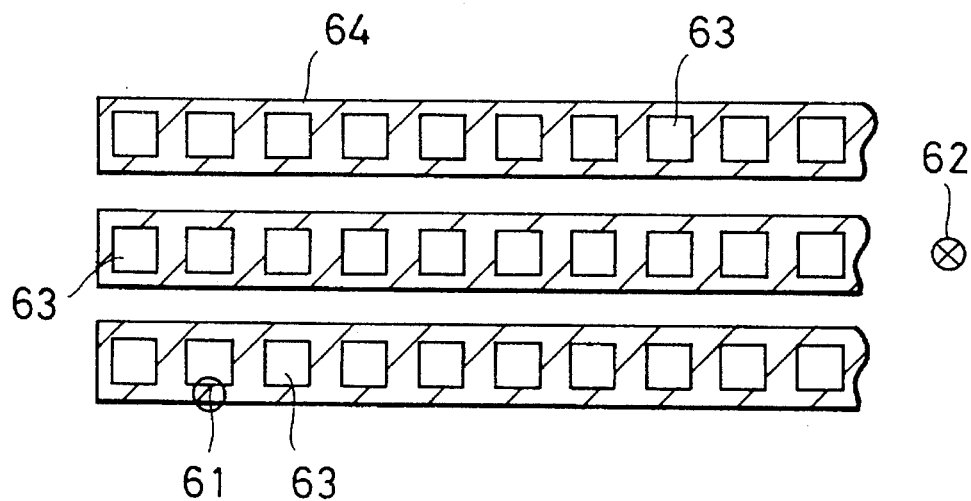
FIG. 7 is a schematic plan view showing the superconducting pattern formed on the magnetic memory in accordance with the third embodiment of the present invention.

Referring now to FIGS. 6 and 7, an apparatus and a method for writing and reading digital information on a magnetic memory in accordance with a third embodiment of the present invention will be explained. The apparatus is illustrated as being composed of an electromagnet 45, a magnetic memory 44, a SQUID 43, a He-Ne laser 42 and a control device 46 for supplying control signals to the SQUID 43 and the laser 42. Although not shown in the figure, the apparatus is placed in a cooling system comprising liquid nitrogen in the same manner as the first embodiment.

The magnetic memory 44 is prepared in the following procedure. A superconducting substrate is provided by depositing a superconducting oxide ceramic film whose composition was expressed by $Bi_2Sr_2CaCu_2O_8$ on the (100) plane of a single crystalline $MgO_2$ plate of 50 mm length, 50 mm width and 2 mm thickness. The deposition is carried out by sputtering to a thickness of 0.1 μm. The superconducting film can be deposited in the form of a very smooth film in which no grain is applicable. The c-axis of this film was confirmed as being normal to the plane of the substrate by X-ray analysis. The critical temperature of the superconducting film was confirmed to be no higher than 90K by measuring the magnetic susceptibility thereof. The superconducting film is then etched by a known photolithography in order to pattern it in the form of a plurality of individual superconducting parallel lines of 3 μm width, each line having openings 6S of 2 μm diameter arranged therealong as illustrated in FIG. 7. One magnetic storage domain is formed around each opening 63 as explained below.

The SQUID 43, which can detect one quantum of magnetic flux as weak as $2\times10^{-15}$ weber, is prepared in the following steps. A superconducting oxide ceramic film whose composition was expressed by $Bi_2Sr_2CaCu_2O_8$ is deposited on the (100) plane of a single crystalline $MgO_2$ plate 84 of 60 mm length, 60 mm width and 2 mm thickness. The deposition is carried out by sputtering to a thickness of 0.1 μm. The superconducting film can be deposited in the form of a very smooth film in which no grain is applicable. The c-axis of this film was confirmed as being normal to the plane of the substrate by X-ray analysis. The critical temperature of the superconducting film was confirmed to be no higher than 90K by measuring the magnetic susceptibility thereof. The superconducting film is then etched by a known photolithography in order to leave a closed line 82 of 10 μm width in the form of a rectangle as shown in FIG. 8. A laser beam 81 is projected to the lines at positions A and A' in order to melt 10 μm of the line at each position as shown in FIG. 9(A). The molten portions are then given thermal annealing at an argon-oxygen atmosphere for 0.5 hour at 850° C. in order to recrystallize the molten portion. The partial pressures of argon and oxygen of the atmosphere is 0.95 atm and 0.05 atm respectively, resulting in the total pressure of 1 atm. By this annealing, polycrystalline portions 83 are formed at the positions with boundaries perpendicular to the superconducting line. It was confirmed by experiment that the SQUID as prepared as above operated at 77K. Reference numeral 72 designates an electrode in FIG. 8.

The reading and writing operations on the memory are carried out as follows. The memory is first placed on the SQUID 43 in a cooling system maintained at liquid nitrogen temperature and subjected to a magnetic field perpendicular to the substrate 44 by means of the electromagnet 45 as indicated at 82 in FIG. 7. The strength of the magnetic field is chosen at no stronger than the transition flux density (lower critical field density) of the superconducting material, e.g. $10^{-3}$ Tesla. In the writing operation, the domains formed around the openings of the superconducting pattern subjected to the magnetic field are scanned by the He-Ne laser 42 which can focus a laser beam 41 sequentially to a spot 81 of about 1 μm diameter on one of the openings or the superconducting material forming the domain currently being scanned. The energy density of the laser beam is $10^3$W/cm$^2$ at the substrate surface. The superconductivity around a domain is decayed when irradiated with the laser beam because the temperature of the pattern rises around the opening of the domain beyond the critical temperature and therefore magnetic fluxes enter the opening. The entering fluxes remain trapped under superconductive state after removal of the irradiation with the laser beam. During scanning, some domains are passed over without irradiation so that no magnetic fluxes are trapped in the domains. In this manner, information can be written in terms of whether or not fluxes are trapped in a domain by selectively irradiating the respective domains with the laser beam.

In the reading operation, the superconducting domains formed around the openings are scanned by the He-Ne laser 42 in the same manner as in the writing operation but without application of the external magnetic field. The laser irradiation, however, is carried out as a probe on all the scanned domains without passover at $10^3$W/cm$^2$. When a domain trapping fluxes is irradiated with a laser beam, the superconductivity of the domain is decayed due to elevation of temperature resulting in the decrease of magnetic fluxes passing through the SQUID 43, which can detect even very small change of magnetic fluxes.

Figure 3:
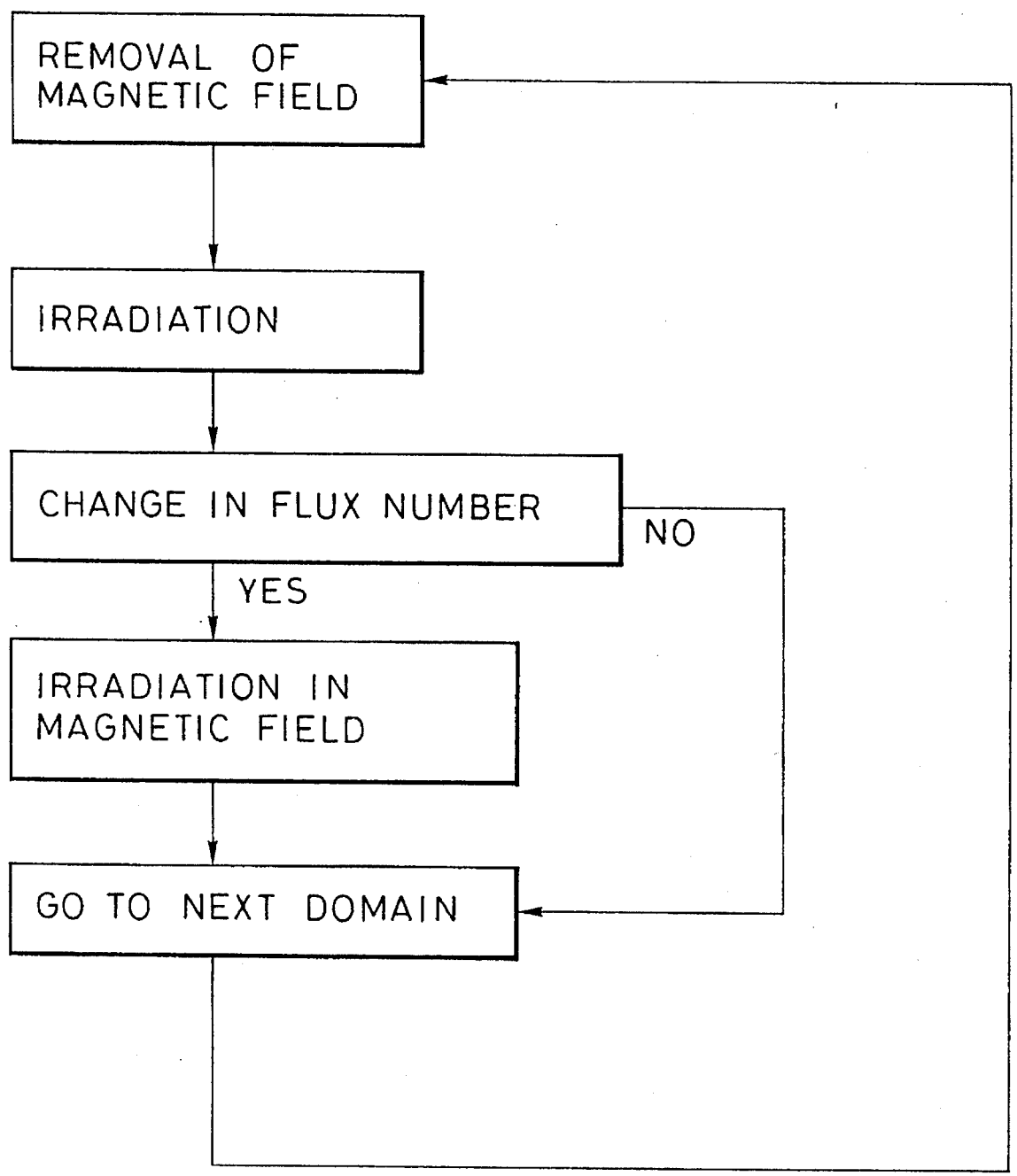
FIG. 3 is a flow chart for explaining the mechanism of restoring information on a magnetic storage domain in accordance with first embodiment of the present invention.

As easily understood from the above description, the information recorded on the disk is deleted by the reading operation in accordance with this embodiment. Magnetic fluxes released from domains have to be trapped in the domains again in order to maintain the recorded condition of the disk. For this purpose, the procedure as illustrated in FIG. 3 can be employed in the same manner as described for the first embodiment.

Figure 10:
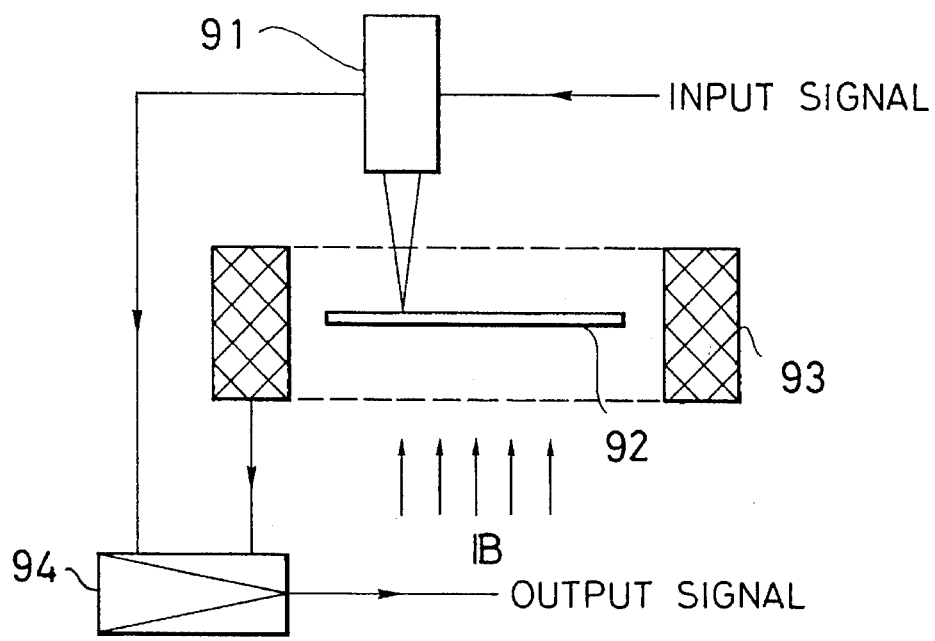
FIG. 10 is a schematic diagram showing an apparatus and method for writing and reading digital information on a magnetic memory in accordance with a fourth embodiment of the present invention.
Figure 11:
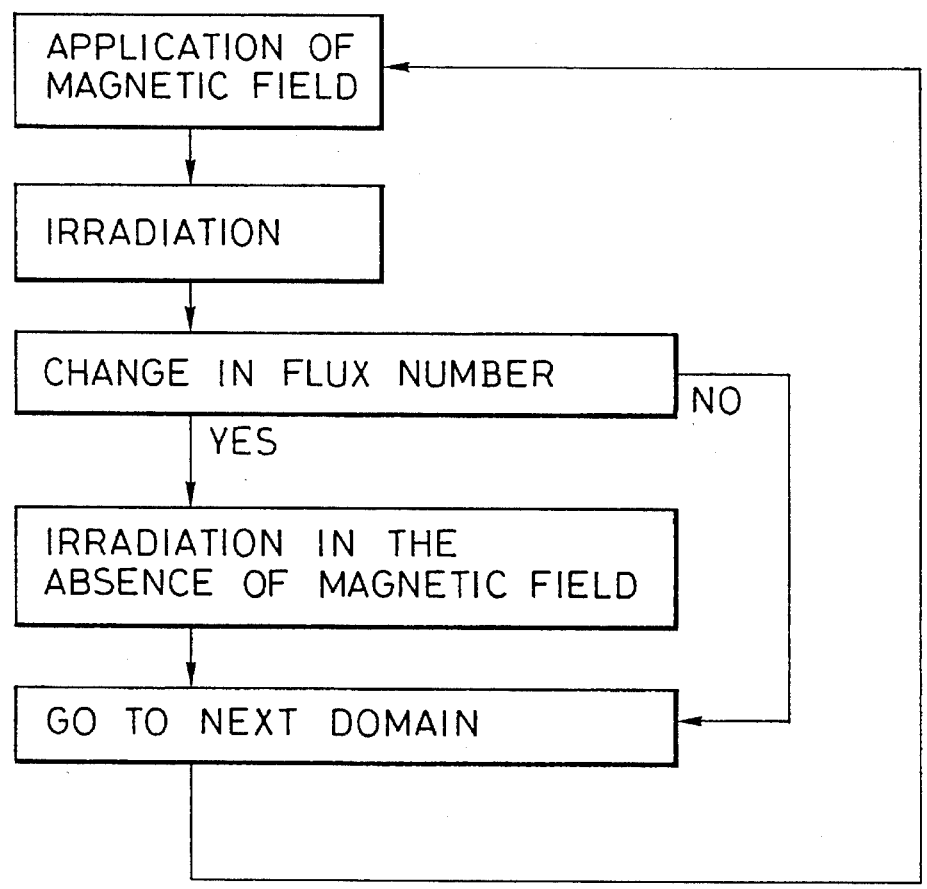
FIG. 11 is a flow chart for explaining the mechanism of restoring information on a magnetic storage domain in accordance with the fourth embodiment of the present invention.

Referring now to FIGS. 10 and 11, an apparatus and a method for writing and reading digital information on a magnetic memory in accordance with a fourth embodiment of the present invention will be explained. The apparatus is illustrated as including a usual coil 93 having 1000 turns, a He-Ne laser 91 provided in order to focus a laser beam on the magnetic memory 92 disposed in the coil 93 and a lock-in amplifier 94. The laser 91 can focus a laser beam in a spot of 10 μm diameter at the memory 92.

The magnetic memory, indicated at 92 in the figure, is prepared in the following steps. A superconducting substrate is provided by depositing a superconducting oxide ceramic film whose composition was expressed by $Bi_2Sr_2CaCu_2O_8$ on the (100) plane of a single crystalline $MgO_2$ plate of 50 mm length, 50 mm width and 2 mm thickness. The deposition is carried out by sputtering to a thickness of 0.1 μm. The superconducting film can be deposited in the form of a very smooth film in which no grain is applicable. The c-axis of this film was confirmed as being normal to the plane of the substrate by X-ray analysis. The critical temperature of the superconducting film was confirmed to be no higher than 90K by measuring the magnetic susceptibility thereof. The superconducting film is then etched by a known photolithography in order to form a plurality of individual open circles of 2 μm diameter arranged in a matrix. The width of circular lines constituting the circles is about 0.2 μm. Each circle forms one magnetic domain for storing information of one bit of the memory.

In the writing operation, superconducting domains formed on the memory 92 are scanned by the He-Ne laser 91 which can focus a laser beam on one of the domains at $10^3$W/cm$^2$. The memory 92 have been given magnetic treatment to trap magnetic fluxes in advance, e.g. by application of a magnetic field stronger than the transition critical value (lower critical field). The superconductivity of the domain is decayed when irradiated because the temperature of the domain rises beyond the critical temperature and therefore the trapped fluxes are released from the domain. During scanning, some domains are passed over without irradiation, leaving trapped magnetic fluxes in the domains.

Alternatively, in the writing operation, superconducting domains formed on the memory 92 are scanned in a magnetic field ($10^{-3}$Tesla) by the He-Ne laser 91 which can focus a laser beam on one of the domains at $10^3$W/cm$^2$ in the same manner. The memory 92 have not been given magnetic treatment to trap magnetic fluxes in advance unlike the above procedure. Namely, there is no magnetic fluxes throughout the memory before the writing operation. The superconductivity of the domain is decayed when irradiated because the temperature of the domain rises beyond the critical temperature and therefore several fluxes are trapped by the domain. During scanning, some domains are passed over without irradiation, leaving the domains without magnetic fluxes.

In this manner, information can be written in terms of whether or not fluxes are trapped in a domain by selectively irradiating the respective domains with the laser beam.

In the reading operation, the superconducting domains formed on the memory 92 are scanned by the He-Ne laser 91 in the same manner as in the writing operation in an external magnetic field perpendicular to the memory 92. The magnetic field has a strength of $10^{-3}$Tesla. The power density of the laser beam is $10^3$W/cm$^2$. The laser irradiation, however, is carried out as a probe on all the scanned domains without passover. When a domain trapping no fluxes is irradiated with a laser beam of 1 μm diameter, the superconductivity of the domain 14 is decayed within $10^{-9}$ second or a shorter time due to elevation of temperature and magnetic fluxes are allowed to enter it, resulting in the increase of magnetic fluxes passing through the coil 93. The increase of passing fluxes induces a small voltage (current) in accordance with Faraday's law of induction, i.e. dφ/dt=V. When a domain trapping fluxes is irradiated with a laser beam, the superconductivity of the domain is also decayed due to elevation of temperature. The decay does, however, not result in the increase of magnetic fluxes passing through the coil 11 because there has been also trapped fluxes after and before the decay. The decay thereby induces no current unlike the case of the domain trapping no fluxes. Accordingly, it can be detected in terms of existence of the small current whether or not a scanned domain has trapped magnetic fluxes.

As easily understood from the above description, the information recorded on the disk is deleted by the reading operation in accordance with this embodiment. Magnetic fluxes trapped anew by the reading operation in some domains have to be released from the domains again in order to maintain the recorded information on the memory. For this purpose, two procedures can be employed. One procedure is to store the information in another storage means and write the information on the disk again from the storage means after the read operation. The other procedure is to remove, just after inserting of fluxes in a domain, fluxes from that domain as described in FIG. 11. Namely, if change in fluxes is detected, the currently scanned domain is irradiated with a laser beam without application of an external magnetic field. The domain is brought into a normal conductivity state due to elevation of temperature and the fluxes are released to restore the bit of information, Thereafter, a subsequent domain is irradiated in the magnetic field in order to detect absence of magnetic fluxes in the domain being scanned. Of course, the irradiation step without the magnetic field is omitted in the sequence when the currently scanned domain has trapped fluxes.

It will be noted that the fourth embodiment is very similar as the first embodiment. In accordance with the fourth embodiment, the detection of the absence of magnetic fluxes is done by increment of magnetic fluxes passing through a detection coil whereas, in accordance with the first embodiment, the detection of the existence of magnetic fluxes is done by decrement of magnetic fluxes passing through a detection coil. The scheme of the fourth embodiment can be employed for any embodiment only by carrying out scanning of domains in an appropriate magnetic field during reading operation.

Referring next to FIG. 12, an apparatus and a method for writing and reading digital information on a magnetic memory in accordance with a fifth embodiment of the present invention will be explained. The apparatus is illustrated as being composed of an electron gun 111, a SQUID 112 and a control device 114 which are disposed in a vacuum vessel not shown in the figure. In this embodiment, the magnetic memory consists of a ferromagnetic substance coated on a substrate. The SQUID 112 is prepared by the same procedure as that of the second embodiment.

The magnetic memory 113 is prepared in the following steps. A Ni thin film is coated on a glass substrate of 50 mm length, 50 mm width and 1 mm thickness. The coating is carried out by vapor evaporation to a thickness of 0.1 μm. The Ni film is then etched by means of high energy ultraviolet laser beams in order to form of a number of 0.2 μm×0.2 μm rectangular lands arranged in a matrix, each land forming one magnetic domain for storing information of one bit of the memory. The density of the memory capacity of the memory is as high as $10^9$ bits/cm$^2$.

The reading and writing operations on the substrate are carried out as follows. The memory is first placed on the SQUID 112 and subjected to a first magnetic field perpendicular to the memory 113 as indicated by arrow B in the figure. All of the domains are magnetized by this first magnetic field perpendicular to the substrate 113.

In the writing operation, the domains formed on the memory 113 are scanned by an electron gun 111 which can direct electron beams to one of the domains with a beam having a diameter of about 0.1 μm. During the scanning, the first magnetic field is removed and a second magnetic field is instead applied to the substrate in the opposed direction, indicated by arrow B'. The domain being irradiated is heated by the electron beam and exhibits paramagnetism to releases magnetic fluxes passing therethrough because the temperature of the domain rises beyond the Curie point (about 380° C.). The domain is then cooled and resumes its ferromagnetic properties, when irradiation is removed, resulting in magnetization in the direction B' due to the second magnetic field. During scanning, some domains are passed over without irradiation, leaving trapped magnetic fluxes in the direction B. In this manner, information can be written in terms of whether fluxes are trapped by a domain in the direction B or B' by selectively irradiating the respective domains with the electron beam.

In the reading operation, the domains formed on the substrate are scanned by the electron gun 111 in the same manner as in the writing operation under the application of the second magnetic field in the direction B'. The beam irradiation, however, is carried out as a probe on all the scanned domains without passover. When a domain trapping fluxes in the direction of B' is irradiated with an electron beam, the ferromagnetism of the domain is first destroyed due to elevation of temperature resulting in the releasing of the trapped magnetic fluxes, and thereafter takes place again in order to retain magnetic fluxes in the same direction in the second magnetic field. The change in magnetic flux in this case is schematically shown by a curve in FIG. 13(A). The origin of the diagram corresponds to the starting time point of irradiation. The magnetic fluxes in the domain are decreased as the change is minus toward the crossover point of the curve indicative of vanishing of magnetic fluxes followed by restoring of magnetic fluxes as the change appears being plus. The total change in magnetic fluxes is zero when integration of the curve is obtained. When a domain trapping fluxes in the direction of B is irradiated with an electron beam, the direction of trapped fluxes is inverted. The change in magnetic flux in this case is schematically shown by a curve in FIG. 13(B). As shown in the figure, the magnetic fluxes monotonically increase. The total change is obtained by integration of the curve.

Figure 14:
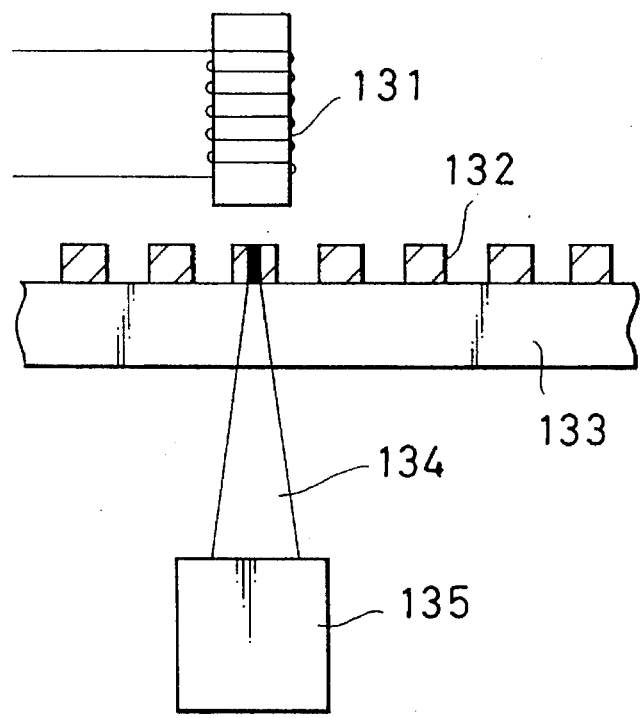
FIG. 14 is a schematic diagram showing an apparatus and a method for writing and reading digital information on a magnetic memory in accordance with a sixth embodiment of the present invention.

Referring now to FIG. 14, an apparatus and a method for writing and reading digital information on a magnetic memory in accordance with a sixth embodiment of the present invention will be explained. The apparatus is illustrated as consisting of a He-Ne laser 135 and a detection coil 131 having 100 turns around a Ni-Zn ferrite core of 10 μm thickness and 100 μm diameter. The apparatus is cooled in a cooling device (not shown) during operation in the same manner as the first embodiment. When the apparatus is desired to operate at frequencies higher than 10 MHz, usual ferrite materials can not follow such high frequencies. In such a case, the coil 131 may be replaced by a SQUID which can operate even at frequencies as high as 1 GHz.

The magnetic memory, indicated at 132 and 133 in the figure, is prepared in the following steps. A superconducting substrate is provided by depositing a superconducting oxide ceramic film whose composition was expressed by $Bi_2Sr_2CaCu_2O_8$ on the (100) plane of a single crystalline $MgO_2$ plate of 50 mm length, 50 mm width and 2 mm thickness. The deposition is carried out by sputtering to a thickness of 1 μm. The superconducting film can be deposited in the form of a very smooth film in which no grain is applicable. The c-axis of this film was confirmed as being normal to the plane of the substrate by X-ray analysis. The critical temperature of the superconducting film was confirmed to be no higher than 90K by measuring the magnetic susceptibility thereof. The superconducting film is then etched by a known photolithography in order to pattern it in the form of a plurality of 1 μm×1 μm×1 μm rectangular lands 132 arranged in a matrix, each land forming one magnetic domain for storing information of one bit of the memory.

The writing operations on the memory are carried out as follows. The memory is subjected, in advance of the actual writing operation, to a magnetic field stronger than the lower critical field (several tens of Gauss in the case of the oxide superconducting material) of the superconducting material in the direction perpendicular to the memory in order that all of the domains traps magnetic fluxes therein. The memory is then disposed between the coil 131 and the laser 135. The clearance between the coil 131 and the surface of the memory is selected to be $10^{-5}$m. Generally, the clearance has to be no shorter than $10^{-6}$m in order to avoid contact between the coil and the surface. The superconducting domains formed on the substrate 133 are scanned by the He-Ne laser 135 which can focus a laser beam 134 on one of the domains. The energy density of the laser beam is $10^3 W/cm^2$ at the domain. The superconducting domains are not damaged by this energy density. When a laser beam is projected to a domain as shown in FIG. 14, the superconductivity of the domain is decayed by the irradiation because the temperature of the domain rises beyond the critical temperature and therefore the trapped fluxes are released from the domain. During scanning, some domains are passed over without irradiation, leaving trapped magnetic fluxes in the domains. In this manner, information can be written in terms of whether or not fluxes are trapped in a domain by selectively irradiating the respective domains with the laser beam.

In the reading operation, the superconducting domains formed on the substrate 133 are scanned by the He-Ne laser 135 in the same manner as in the writing operation. The laser irradiation, however, is carried out as a probe on all the scanned domains without passover at $10^3 W/cm^2$. When a domain trapping fluxes is irradiated with a laser beam, the superconductivity of the domain is decayed due to elevation of temperature resulting in the decrease of magnetic fluxes passing through the coil 131. The decrease of passing fluxes induces a small voltage (current) in accordance with Faraday's law of induction, i.e. $d\phi/dt=V$. When a domain trapping no fluxes is irradiated with a laser beam, the superconductivity of the domain is also decayed due to elevation of temperature. The decay does, however, not result in the decrease of magnetic fluxes passing through the coil 131 because there has been trapped no fluxes after and before the decay. The decay thereby induces no current unlike the case of the domain trapping fluxes. Accordingly, it can be detected in terms of existence of the small current whether or not a scanned domain has trapped magnetic fluxes.

Next, the induced voltage which can be used for detection will be theoretically estimated. The base equation is Faraday's law of induction, i.e. $d\phi/dt=V$. The time period necessary for vanishing of magnetic fluxes is of the order of $10^{-10}$ second (quicker vanishing may be possible). The magnetic fluxes trapped by one domain are as small as about $10^{-14}$ weber if the domain comprises a superconducting area of $10^{12} cm^2$. If the coil is located above the domain at a distance of $10^{-5}m$ therebetween, the magnetic fluxes passing through the coil are $10^{-15}$ weber. The induced voltage detected by the coil having 100 turns is then calculated to be $10^{-3}V$. This induction can be detected with the aid of a usual amplifier. The detection of induction is possible without relying on the induction by the use of a SQUID which can detect change in magnetic flux as weak as $10^{-15}$ weber.

Figure 15:
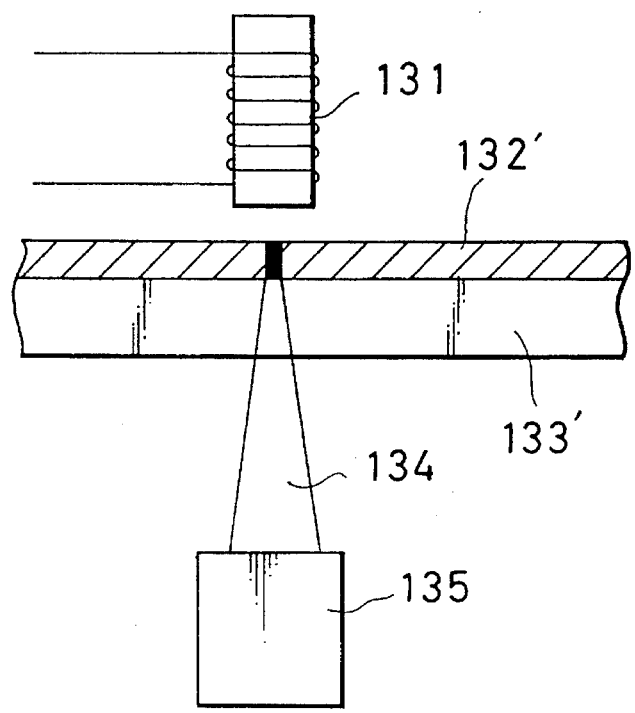
FIG. 15 is a schematic diagram showing an apparatus and a method for writing and reading digital information on a magnetic memory in accordance with a seventh embodiment of the present invention.

Referring now to FIG. 15, an apparatus and a method for writing and reading digital information on a magnetic memory in accordance with a sixth embodiment of the present invention will be explained. The apparatus is illustrated as consisting of a He-Ne laser 135 and a detection coil 131 having 100 turns around a Ni-Zn ferrite core of 10 μm thickness and 100 μm diameter in the same manner as the previous embodiment.

In this embodiment, the magnetic memory is composed of a ferromagnetic medium which is prepared in the following steps. A Ni thin film 132' is coated on a glass substrate 133' of 50 mm length, 50 mm width and 1 mm thickness. The coating is carried out by vapor evaporation to a thickness of 1 μm. Magnetic domains for storing information are defined by the following writing procedure. The density of the memory capacity of the memory is $10^8$ bits/cm² in typical cases.

In the writing operation, the memory is disposed and precisely moved for scanning by means of a suitable carrying mechanism between the coil 131 and the laser 135 in order to enable the He-Ne laser 135 to project a laser beam 134 sequentially on a spot of 1 μm diameter forming a storage domain at $10^3 W/cm^2$. The clearance between the coil 131 and the surface of the memory is selected to be $10^{-5}m$. Generally, the clearance has to be no shorter than $10^{-5}m$ in order to avoid contact between the coil and the surface. Namely, a matrix of storage domains is defined in accordance with the scanning operation during the relative stepwise movement of the laser to the memory. The domains on the memory are scanned by the laser 135. During the scanning, a magnetic field is applied to a domain being scanned in the direction perpendicular to the memory by means of the coil 131. The strength of the magnetic field is selected to be about $10^{-4}$ Tesla at the domain. The domain then comes to exhibit paramagnetism by the [heating when irradiated with a laser beam and is cooled to resume its ferromagnetic properties, when irradiation is removed. The domain is magnetized during cooling in the applied magnetic field. During scanning, some domains are passed over without irradiation so that no magnetization will occur. In this manner, information can be written in terms of whether or not fluxes are trapped by selectively irradiating the respective domains with the laser beam during scanning.

In the reading operation, the domains formed on the memory are scanned by the laser beam in the same manner as in the writing operation without application of a magnetic field. The irradiation of the laser beam, however, is carried out as a probe on all the scanned domains without passover. When a domain trapping fluxes is irradiated with the laser beam, the ferromagnetism of the domain is destroyed due to elevation of temperature resulting in the releasing of magnetic fluxes, resulting in induction of a small voltage across the coil 131. When a domain trapping no flux is irradiated with the laser beam, there is no change in magnetic fluxes. The irradiation thereby induces no voltage unlike the case of the domain trapping fluxes. Accordingly, it can be detected in terms of existence of the small voltage across the coil 131 whether or not fluxes are trapped by a domain. In accordance with experiments, it was confirmed by the use of laser beams modulated at 100 MHz that reading operation of a bit could be carried out within no longer than $10^{-7}$ second.

Next, the induced voltage which can be used for detection will be theoretically estimated. The density of magnetic flux at the surface of a domain trapping magnetic fluxes is 0.1 Tesla, which is an ordinal value in case of usual ferromagnetic substances. The magnetic momentum of one domain is then $10^{-19}$ weber·m if the area of the domain of 1 μm thickness is about $10^{-12}m^2$ corresponding to the spot of the laser beam. The magnetic fluxes passing through the coil can be considered to be about μ·m/d where μ, m and d are the relative permeability of the material of the core, the magnetic moment of the domain and the distance between the coil and the surface of the memory. The relative permeability, which is depending upon the driving frequency, is about 100 at 10 MHz. The distance is $10^{-5}m$. Accordingly, the magnetic fluxes passing through the coil are calculated on the order of $10^{-12}$ weber. The time period necessary for disappearance of fluxes by heating is of the order of about $10^{-7}$ second (corresponding to 10 MHz). The induced voltage across the coil is then calculated to be $10^{-3}V$, which can be easily detected.

Referring now to FIGS. 16(A) to 16(D), an apparatus and a method for writing and reading digital information on a magnetic memory in accordance with an eighth embodiment of the present invention will be explained. The apparatus and the magnetic memory are same as those of the third embodiment as illustrated in FIGS. 6 and 7, which are also referred to herein for explanation of this embodiment, except that the control device 46 can supply a DC current to each superconducting line. In this embodiment, no magnetic field application device is necessary.

In the writing operation, a DC superconducting current 141 is passed through each superconducting line as shown in FIG. 16(A). The superconducting domains formed around the openings 63 in the lines are scanned by the He-Ne laser 42 which can focus a laser beam 41 on an edge of one of the domains as depicted by a circle in FIG. 16(B). The superconductivity of the irradiated portion is decayed because the temperature rises beyond the critical temperature and therefore the passage of current change in order to avoid the irradiated portion as shown in FIG. 16(B). When the laser beam is removed, the domain exhibits the properties of superconductivity again and therefore superconducting current is passed again through the portion as illustrated in FIG. 16(C). In this respect, it should be noted that the new current flow is caused in the both directions from right and left. When the current supply by the control device 46 is stopped after the scanning is completed, a circulating current remains at each irradiated domain as illustrated in FIG. 16(D). Of course, during scanning, some domains are passed over without irradiation in the same manner as the previous embodiments. In this manner, information can be written in terms of whether or not fluxes are trapped in a domain by selectively irradiating the respective domains with the laser beam.

The reading operation is same as that of the third embodiment so that no redundant description will be repeated. In this eighth embodiment, procedure for restoring information can be done in a similar manner as described in FIG. 3. When magnetic fluxes are released from a domain by the reading operation, fluxes can be restored in the domain by passing a current through the superconducting lines by the device 46 and irradiating the domain with a laser beam so that a circular current is formed again when the supplied current is removed.

The outstanding advantage of the eighth embodiment as compared with the third embodiment is facilitation of increasing the packing density of storage domains. In the case of the third embodiment, if the diameter of the opening is 0.1 μm, a single quantized magnetic flux trapped therein corresponds to a flux density of as high as 0.1 Tesla. A special device is required to induce such a strong magnetic field.

The foregoing description of preferred embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated.

What is claimed is:

1. A method for writing digital information on a magnetic memory comprising the steps of:

inserting magnetic fluxes into storage domains formed on a memory consisting of a superconducting material by pinning effect; and selectively and sequentially irradiating said storage domains formed on said memory and having magnetic fluxes inserted therein for heating them beyond the critical temperature of said material.

2. The method for writing digital information as claimed in claim wherein said irradiation is carried out with laser beams.

3. The method for writing digital information as claimed in claim 1 wherein said irradiation is carried out with electron beams.

4. A method for reading digital information on a magnetic memory comprising the steps of:

scanning superconducting storage domains having non-superconducting openings therein and formed on a memory consisting of a superconducting material in which magnetic fluxes have been selectively trapped by said storage domains in accordance with information stored in said memory, said scanning being performed in a magnetic field having the same direction to the magnetic fluxes, said scanning further being carded out by irradiation in order to cause phase transition of said material between its superconducting phase and its normal conducting phase through elevation and fall of the temperature of the domain being irradiated; and detecting change in magnetic fluxes induced by said memory during said scanning, wherein the digital information in said magnetic memory is determined from said change in magnetic fluxes.

5. The method for reading digital information as claimed in claim 4 wherein said irradiation is carried out with laser beams.

6. The method for reading digital information as claimed in claim 4 wherein said irradiation is carried out with electron beams.

7. A method for writing digital information on a magnetic memory comprising the steps of:

generating a magnetic flux in the magnetic memory by flowing superconducting current through a continuous superconducting line consisting of a superconducting material in which a plurality of storage domains are formed around non-superconducting openings;

selectively and sequentially irradiating said storage domains formed on said memory for heating them beyond the critical temperature of said material; and removing said superconducting current from said superconducting line.

8. A method for writing digital information on a magnetic memory comprising the steps of:

generating a magnetic field in the magnetic memory not more than the lower critical field of a superconducting material: and selectively and sequentially irradiating storage domains having non-superconducting openings therein formed on a memory consisting of said superconducting material for heating them beyond the critical temperature of said material.

9. The method for writing digital information as claimed in claim 8 wherein said irradiation is carried out with laser beams.

10. The method for writing digital information as claimed in claim 8 wherein said irradiation is carried out with electron beams.

11. A method for reading digital information on a magnetic memory comprising the steps of:

scanning storage domains formed on a memory consisting of a superconducting material in which magnetic fluxes have been selectively trapped by said storage domains in accordance with information stored in said memory, said scanning being carried out by irradiation in order to cause phase transition of said material from its superconducting phase to its normal conducting phase through elevation of the temperature of the domain being irradiated; and detecting change in magnetic fluxes induced by said memory during said scanning, wherein the digital information in said magnetic memory is determined from said change in magnetic fluxes.

12. The method for reading digital information as claimed in claim 11 wherein said irradiation is carried out with laser beams.

13. The method for reading digital information as claimed in claim 11 wherein said irradiation is carried out with electron beams.

14. An apparatus for writing and reading digital information on a magnetic memory comprising:

a memory consisting of a superconducting material in which magnetic fluxes are selectively trapped by a number of storage domains formed therein in accordance with information to be stored in said memory;

a magnetic field detection means for detecting the change in magnetic fluxes in one direction throughout said memory;

a beam irradiation means for selectively irradiating one of said storage domains with a beam; and a magnetic field application device for applying a magnetic field to said memory.

15. The apparatus for writing and reading digital information as claimed in claim 14 further comprising a cooling system for cooling said memory to a temperature lower than the critical temperature of the superconducting material.

16. The apparatus for writing and reading digital information as claimed in claim 14 wherein said memory is a substrate coated with an oxide superconducting ceramic.

17. The apparatus for writing and reading digital information as claimed in claim 16 wherein said oxide superconducting ceramic is in the form of $Bi_2Sr_2CaCu_2O_8$.

18. The apparatus for reading and writing digital information as claimed in claim 14 wherein said magnetic field application device is provided in order to apply the magnetic field to said memory in parallel to a substrate containing said memory.

19. The apparatus for writing and reading digital information as claimed in claim 14 wherein said beam irradiation means projects laser beams to said memory.

20. The apparatus for writing and reading digital information as claimed in claim 14 wherein said beam irradiation means projects electron beams to said memory.

21. The apparatus for writing and reading digital information as claimed in claim 14 wherein said magnetic field detection means is a coil provided around said memory.

22. The apparatus for writing and reading digital information as claimed in claim 14 wherein said magnetic field detection means is a SQUID provided near said memory.

* * * * *